US005821518A

United States Patent [19]

Sussmeier et al.

[11] Patent Number: 5,821,518
[45] Date of Patent: Oct. 13, 1998

[54] METHOD AND APPARATUS FOR A PORTABLE NON-CONTACT LABEL IMAGER

[75] Inventors: John William Sussmeier, Wappingers Falls, N.Y.; Luis Figarella, Waterbury, Conn.; Paul Pay-Lun Ju, Ft. Myers, Fla.

[73] Assignee: United Parcel Service of America, Inc., Atlanta, Ga.

[21] Appl. No.: 718,612

[22] Filed: Sep. 23, 1996

Related U.S. Application Data

[63] Continuation of Ser. No. 328,927, Oct. 25, 1994, abandoned.
[51] Int. Cl.[6] ........................................... C06K 7/10
[52] U.S. Cl. ........................ 235/462; 235/472; 235/470
[58] Field of Search ........................ 235/462, 375, 235/472, 454; 358/213, 220; 348/294, 296

[56] References Cited

U.S. PATENT DOCUMENTS

| | | | |
|---|---|---|---|
| 4,188,103 | 2/1980 | Biber et al. | 354/27 |
| 4,282,425 | 8/1981 | Chadima, Jr. et al. | 235/462 |
| 4,396,950 | 8/1983 | Roth | 358/213 |
| 4,471,228 | 9/1984 | Nishizawa et al. | 250/578 |
| 4,538,060 | 8/1985 | Sakai et al. | 235/472 |
| 4,578,571 | 3/1986 | Williams | 235/472 |
| 4,673,805 | 6/1987 | Shepard et al. | 235/472 |
| 4,734,566 | 3/1988 | Senda et al. | 235/472 |
| 4,743,773 | 5/1988 | Katana et al. | 250/566 |
| 4,818,847 | 4/1989 | Hara et al. | 235/455 |
| 4,818,856 | 4/1989 | Matsushima et al. | 235/472 |
| 4,874,936 | 10/1989 | Chandler et al. | 235/494 |
| 4,877,949 | 10/1989 | Danielson et al. | 235/462 |
| 4,881,127 | 11/1989 | Isoguchi et al. | 358/213 |
| 4,900,907 | 2/1990 | Matusima et al. | 235/472 |
| 4,908,709 | 3/1990 | Inuiya et al. | 358/213 |
| 5,019,699 | 5/1991 | Koenck | 235/472 |
| 5,250,979 | 10/1993 | Wheeler | 354/423 |
| 5,278,399 | 1/1994 | Sano | 235/472 |
| 5,278,659 | 1/1994 | Araki | 358/213.19 |
| 5,280,161 | 1/1994 | Niwa | 235/462 |
| 5,308,960 | 5/1994 | Smith et al. | 235/454 |
| 5,313,051 | 5/1994 | Brigida | 235/375 |
| 5,313,373 | 5/1994 | Bjorner et al. | 362/19 |
| 5,325,276 | 6/1994 | Sullivan | 362/84 |
| 5,378,883 | 1/1995 | Batterman et al. | 235/472 |
| 5,408,084 | 4/1995 | Brandorff | 250/208 |

FOREIGN PATENT DOCUMENTS

| | | |
|---|---|---|
| 91119175 | 10/1987 | European Pat. Off. . |
| 92306637 | 7/1992 | European Pat. Off. . |
| WO 93/17397 | 2/1993 | WIPO . |
| WO 94/19766 | 2/1994 | WIPO . |

*Primary Examiner*—Donald T. Hajec
*Assistant Examiner*—Karl Frech
*Attorney, Agent, or Firm*—Jones & Askew, LLP

[57] ABSTRACT

A portable non-contact label imager captures an image of two-dimensional information indicia on a label. The captured image data is decoded by a decoder. The label imager forms a part of a data terminal, which includes a keypad, display and signature capture pad. Upon receipt of a start signal from the data terminal's circuitry, the label imager automatically carries out the steps required to capture the label information indicia. The label imager provides aiming indicia to allow the user to properly aim the camera. A position sensing device determines when the target label is within the camera's depth of field. At that time, the label imager determines the shutter speed required for a correct exposure by measuring the light reflected from the label. The label imager then captures the label image, which is decoded by the decoder. Corresponding output data is then provided to the data terminal.

24 Claims, 9 Drawing Sheets

METHOD AND APPARATUS FOR A PORTABLE NON-CONTACT LABEL IMAGER

This is a continuation of application Ser. No. 08/328,927 filed Oct. 25, 1994 now abandoned

TECHNICAL FIELD

The present invention relates to devices for reading codes on labels, and more particularly relates to a non-contact imaging system capable of reading bar codes and two-dimensional dense codes omni-directionally.

BACKGROUND OF THE INVENTION

Various types of machine-readable codes and electronic code readers are known in the art. These devices are useful because they eliminate the need for data to be manually entered into a terminal by an user. This is desirable because it allows data to be collected more quickly and more accurately than is possible with manual data entry.

Laser scanners are commonly used to read one-dimensional bar codes, which are used in a variety of applications. For example, bar codes appear on a wide variety of goods and merchandise, and on shipping labels that are affixed to packages. Once a bar code is read and decoded by a suitable bar code reader, a computer may use the decoded number to access associated data that has been stored in a database. For example, with goods and merchandise, each product has a unique bar code number, and the associated data would identify the product and its price, manufacturer, etc. With a package, the label number would uniquely identify the package, and the associated data would include information such as the size and weight of the package, the origin and destination addresses, and type of service selected (e.g., overnight delivery, second day delivery, etc.).

In the case of portable, non-contact bar code readers, the laser beam that is used to read the label also serves two other important functions. The laser beam projects a visible line that allows the user to aim the bar code reader at the target label, and to properly orient the bar code reader with respect to the bar code's axis. In addition, the intensity and wavelength of the laser light are such that the ambient lighting conditions in stores, offices, warehouses, etc. do not affect the bar code reader's ability to read the label.

One-dimensional bar codes are best suited for applications requiring a maximum of approximately 15 characters. In order to encode larger amounts of data using one-dimensional bar codes, the bar codes must be relatively large. This results in labels that are too large to fit on small items, and which require relatively large amounts of paper.

In order to practically encode larger amounts of data, compact two-dimensional codes or symbologies have been developed. For example, a hexagonal coding symbology can encode up to 100 characters in an area that is approximately 1 inch square. Such a symbology is disclosed in U.S. Pat. No. 4,998,010, entitled "Polygonal Information Encoding Article, Process and System," and U.S. Pat. No. 4,874,936, entitled "Hexagonal, Information Encoding Article, Process and System," the disclosures of which are incorporated herein by reference and made a part hereof. When used on package labels, these two-dimensional symbologies allow shipping information such as origin, destination, weight, type of service, etc. to be read directly from the label, without requiring associated data to be looked up in a centralized data base.

The conventional laser scanners that are used to read one-dimensional bar codes are not capable of reading two-dimensional codes. However, cameras that employ charge coupled device (CCD) arrays are capable of "capturing" images of both one-dimensional and two-dimensional codes. The process of capturing an image, which is analogous to taking a snap-shot with a conventional photographic camera, involves focusing an image on the CCD array, and exposing the CCD array to the image for a predetermined period of time. The exposure time is referred to as the electronic shutter speed. Once the output of the CCD camera is digitized, it may be stored and/or manipulated prior to being decoded. The ability to "rotate" the image data after the image is captured allows a code to be captured and decoded without regard to its rotational orientation. Thus, it is not necessary to align the camera with a particular axis of the code.

Because a CCD camera captures a two-dimensional image and provides image data to a decoding algorithm, a label reading device employing a CCD camera is as versatile as the decode algorithms programmed in the terminal. This allows a single reader to be used to read and decode various types of bar codes and two-dimensional symbologies, provided the appropriate decoding algorithm is available. Examples of such cameras and associated methods are disclosed in U.S. Pat. No. 5,329,105, entitled "Method and Apparatus for Determining the Width of Elements of Bar Code Symbols," U.S. Pat. No. 5,308,960, entitled "Combined Camera System," and U.S. Pat. No. 5,276,315, entitled "Method and Apparatus for Processing Low Resolution Images of Degraded Bar Code Symbols," the disclosures of which are incorporated herein by reference.

CCD cameras are readily available and well suited to this application. However, it is necessary to adjust the electronic shutter speed in order to ensure that the CCD camera is properly exposed when it captures the label image. A properly exposed image is neither too bright (overexposed), nor too dark (underexposed). In addition, it is necessary to ensure that the camera is aimed at the label, and that the distance between the camera and the label (i.e., the object distance) falls within a predetermined range. The proper object distance ensures that the image that is focused on the camera is the proper size, i.e., small enough to fit on the CCD array, yet large enough to be properly decoded by the decoding algorithm that is applied to the digitized image data.

Although the prior art includes label imagers that provide aiming indicia and exposure control, there is a need in the art for a non-contact label imager that facilitates the proper aiming, positioning, and exposure of the camera. The operation should be automated, simple, and should require minimal action on the part of the user. Therefore, there is a need in the art for a non-contact label imager in which a single actuation of a scan button initiates all such functions of a read sequence.

SUMMARY OF THE INVENTION

The present invention is directed to a label imager that satisfies these needs. A portable non-contact label imager having the features of the present invention comprises a camera, a source of illumination, aiming indicia and a position sensing device for determining when a label is within the camera's depth of field.

Generally described, the present invention provides a non-contact imager for capturing information indicia located on a surface. In order to capture the information indicia, the imager includes a camera having an adjustable speed shutter. The imager includes means for providing aiming indicia, which are projected on to the surface and correspond to the field of view of the camera. A range finder is provided in order to determine the distance between the imager and the surface. An illumination source illuminates the portion of the surface that includes the information indicia. The imager includes a controller that is operatively connected to the camera, the aiming indicia providing means, the range finder, and the illumination source.

After the aiming indicia have been activated, the controller is operative for determining whether the distance between the imager and the surface is within a predetermined range of distances. If so, the controller deactivates aiming indicia providing means. The controller determines a proper shutter speed for the camera and captures an image of the information indicia using the camera.

More particularly described, a non-contact imager having the features of the present invention may include a light sensor for measuring light reflected from the surface. The controller uses the light sensor to determine the proper shutter speed by activating the illumination source, measuring the amount of light present at the light sensor, and determining the proper shutter speed for the camera in response to the amount of light measured at the light sensor. After the light is measured by the light sensor, the controller deactivates the illumination source.

Alternatively, a non-contact imager determines the proper shutter speed by activating the illumination source, determining the amount of light present at the camera during a preliminary exposure, and determining the proper shutter speed for the camera in response to the amount of light measured at the camera. The controller deactivates the illumination source after the light is measured by the camera.

In another aspect, the present invention provides a method for operating a non-contact imager for capturing information indicia on a surface. The method determines if the distance between the imager and the surface is within a predetermined range of distances and, if so, deactivates aiming indicia. At that point, the method determines a proper shutter speed for a camera, which provides an adjustable shutter speed, and obtains an image of the information indicia using the proper shutter speed. The method provides output data, which corresponds to the image data provided by the camera.

More particularly described, the method of the present invention determines the proper shutter speed by activating an illumination source, and measuring the amount of light present at the imager. The proper shutter speed is determined in response to the amount of light measured at the imager. The amount of light present at the imager can be determined by measuring a voltage provided by a light sensor, or by capturing an image of the information indicia during a preliminary exposure and analyzing the captured image. The preliminary exposure is taken using a predetermined shutter speed.

Accordingly, it is an object of the present invention to provide a non-contact imager that automatically executes all of the functions associated with a read cycle.

It is another object of the present invention to provide aiming indicia for indicating the field of view of the imager's camera.

It is another object of the present invention to provide a position sensing device that determines whether the distance between a surface and the imager is within a predetermined range of distances.

It is another object of the present invention to provide a non-contact imager that determines a proper shutter speed and captures an image in response to a determination that a surface is within a predetermined range of distances of said imager.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
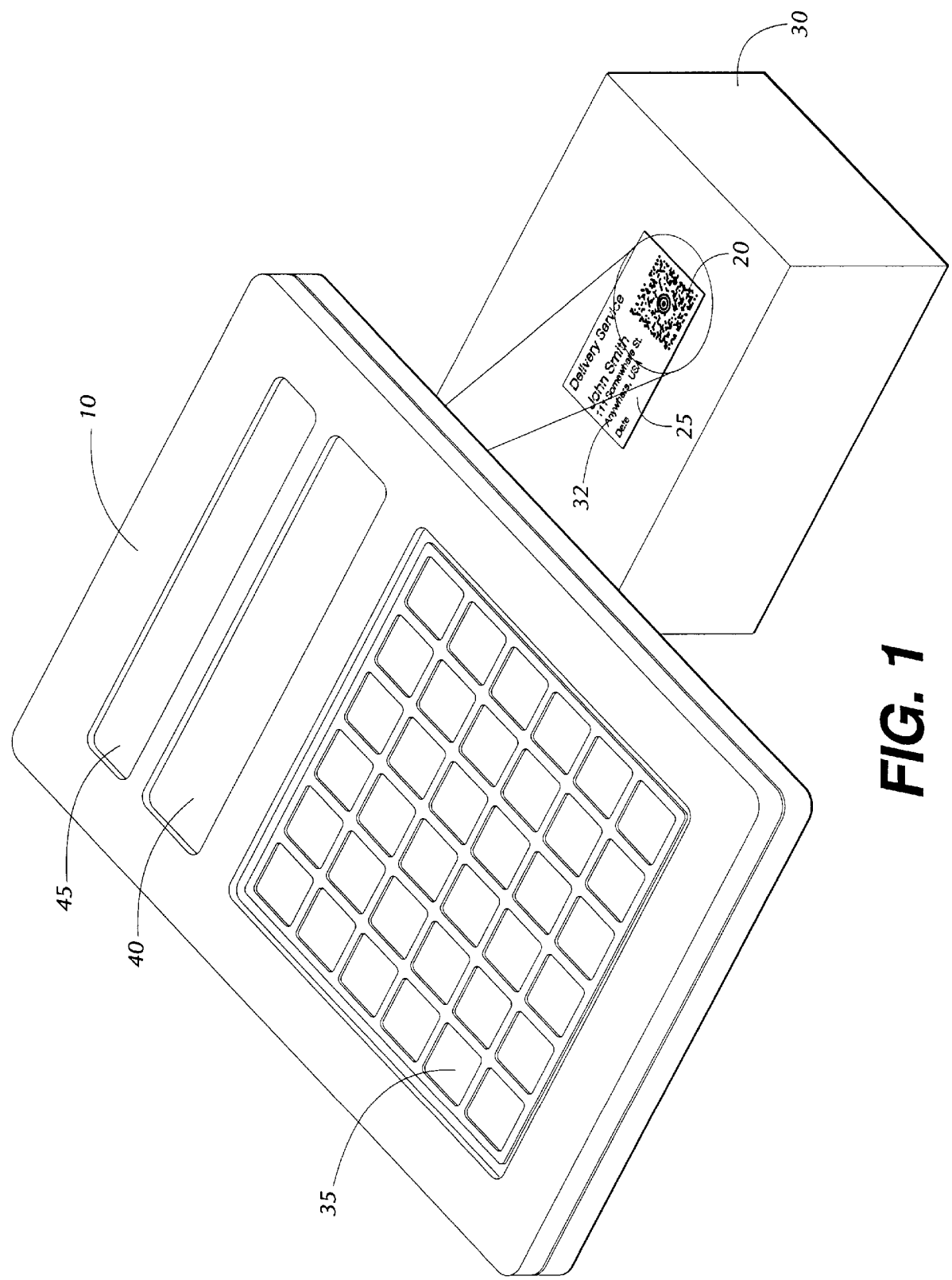
FIG. 1 is a perspective view of a portable data terminal that employs the non-contact label imager of the present invention to read a label on a package.
Figure 2:
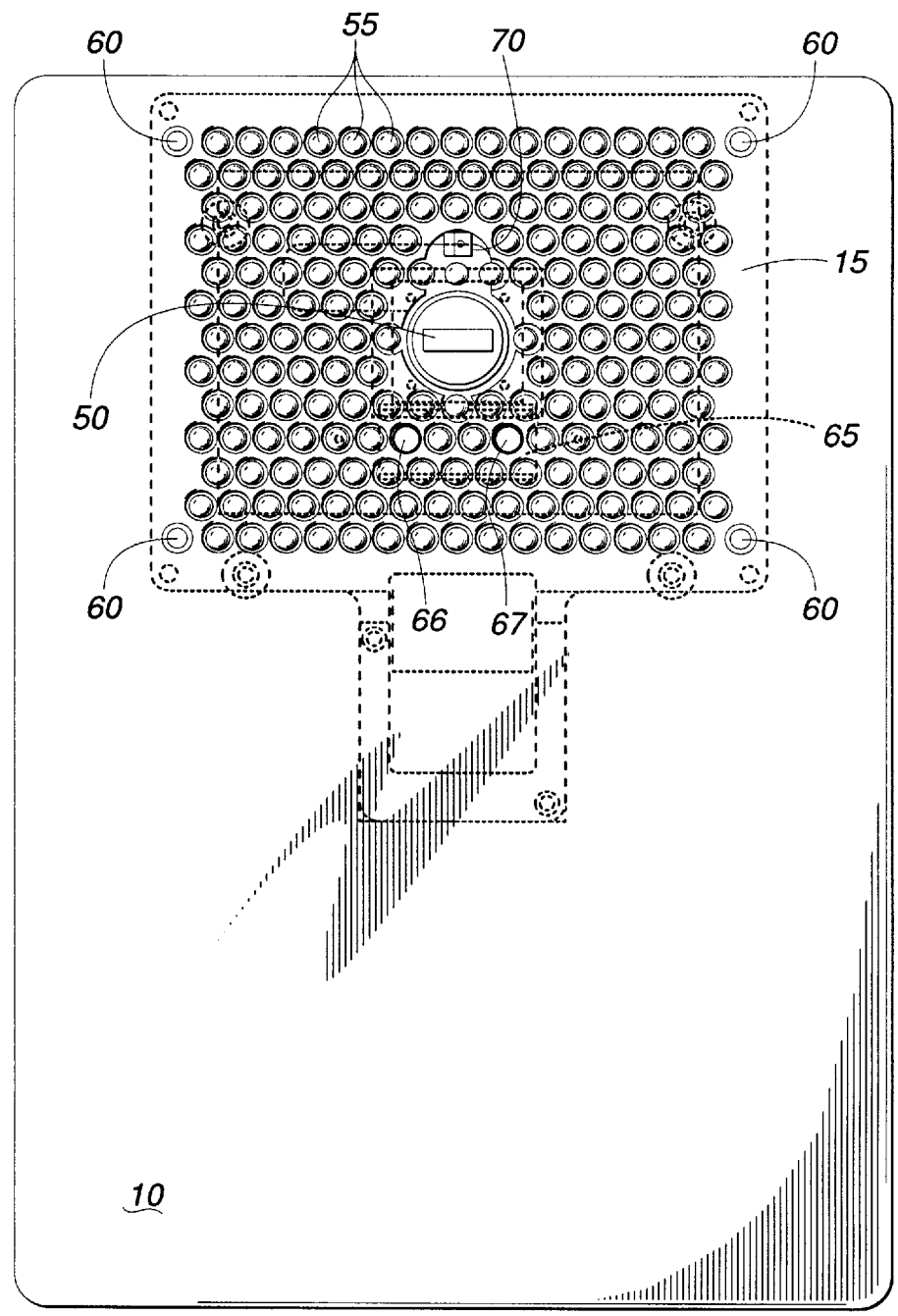
FIG. 2 is a bottom plan view of the portable data terminal of FIG. 1, illustrating the position of various components.
Figure 3:
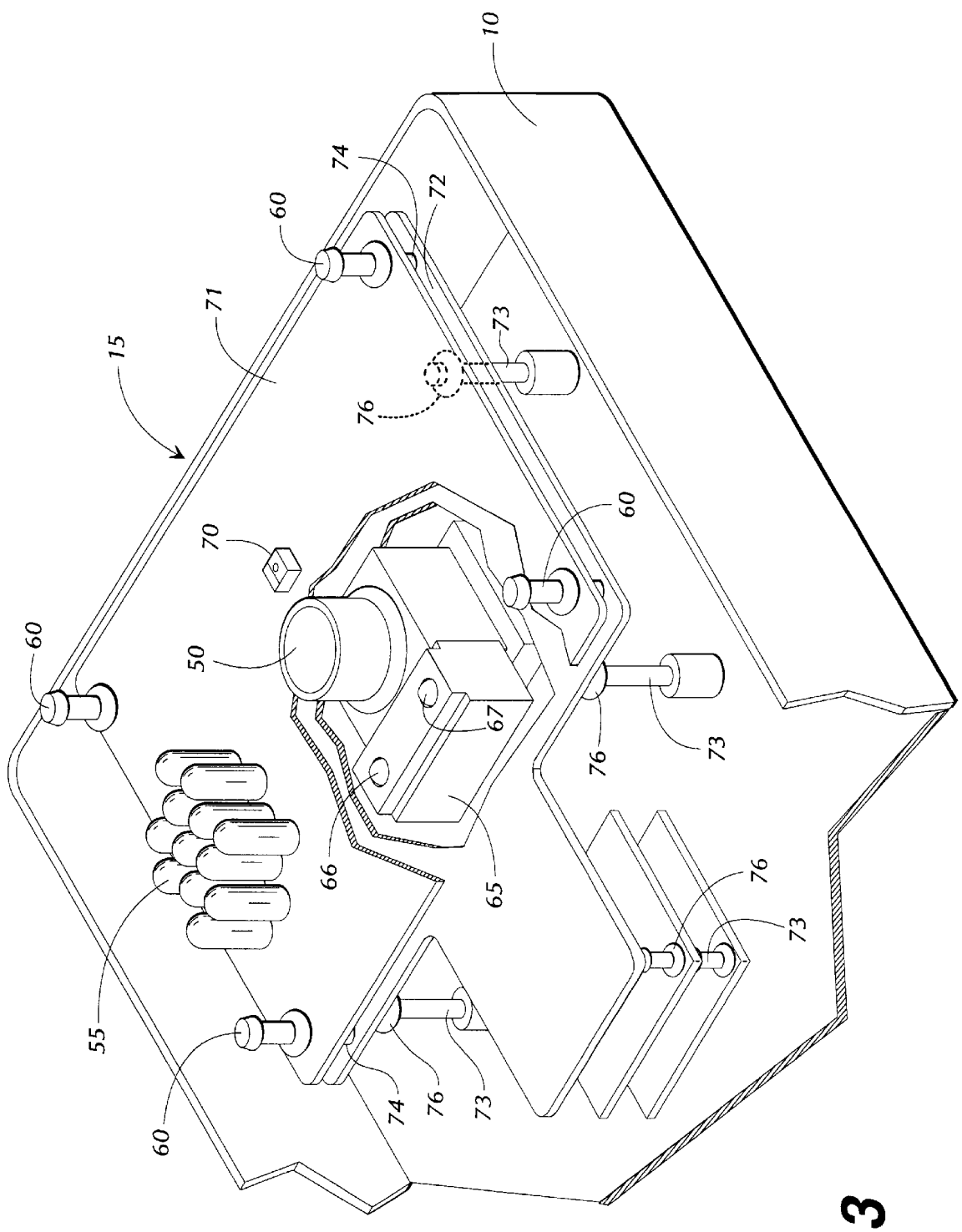
FIG. 3 is an isometric view of a portion of the interior of the portable data terminal of FIG. 1, illustrating the position of various components.

Referring now to the drawings, in which like numerals represent like elements throughout the several figures, FIGS. 1–3 illustrate a portable data terminal 10 that employs a non-contact label imager 15 embodying the present invention. The preferred label imager 15 is mounted in the bottom of the portable data terminal 10, and is capable of capturing images of information indicia, such as a two-dimensional code 20 that is printed on a label 25 on a package 30. The label 25 also includes printed alphanumeric characters 32 indicating the package identification number, recipient and destination address. The image data that is captured by the imager is decoded by a separate decoder 34.

Generally described, the primary function of the data terminal 10 is to facilitate the collection of package-related data by a package delivery service's delivery personnel. The collected data is transferred to a central computer system for tracking and billing purposes. A keypad 35 provides both alphanumeric and function-related keys that allow the user to enter commands and alphanumeric data. A signature capture pad 40 is used to digitize and capture the signature of the person receiving the package. A display 45 is used to reflect data entered via the keypad and signature capture pad, and to provide shipping information (e.g., prices, etc.) in response to input data. An optical interface port (not shown) is provided in order to allow serial data to be transferred to and from the portable data terminal 10. The portable data terminal 10 is controlled by a microprocessor and other electronic circuitry (not shown). A portable data terminal including such features is described in U.S. Pat. No. 5,278, 399, entitled "Data Entry Unit," the disclosure of which is incorporated herein by reference.

As mentioned above, automatic label reading devices are useful for reading labels affixed to packages. The portable data terminal 10 is equipped with the label imager 15, which is the preferred embodiment of the present invention, and with the decoder 34. The preferred label imager 15 and decoder 34 allow the data terminal 10 to capture and decode a one-dimensional code or two-dimensional code 20, which is printed on the label 25. The data terminal 10 is able to associate the decoded package identification data captured from the label 25 with information entered via the keypad 35. In addition, the signature capture pad 40 is used to record the signature of the person who signs for the package at its destination. After the pertinent data is collected by and stored in the data terminal 10, the data may be transmitted to the package delivery service's central computer via the terminal's communications ports.

Alternatively, the data terminal 10 could be equipped with both the label imager 15 and a one-dimensional bar code scanner (as described in U.S. Pat. No. 5,278,399). In this embodiment, the bar code scanner would be used to read one-dimensional bar codes, and the label imager 15 could be used to read two-dimensional codes.

Figure 4:
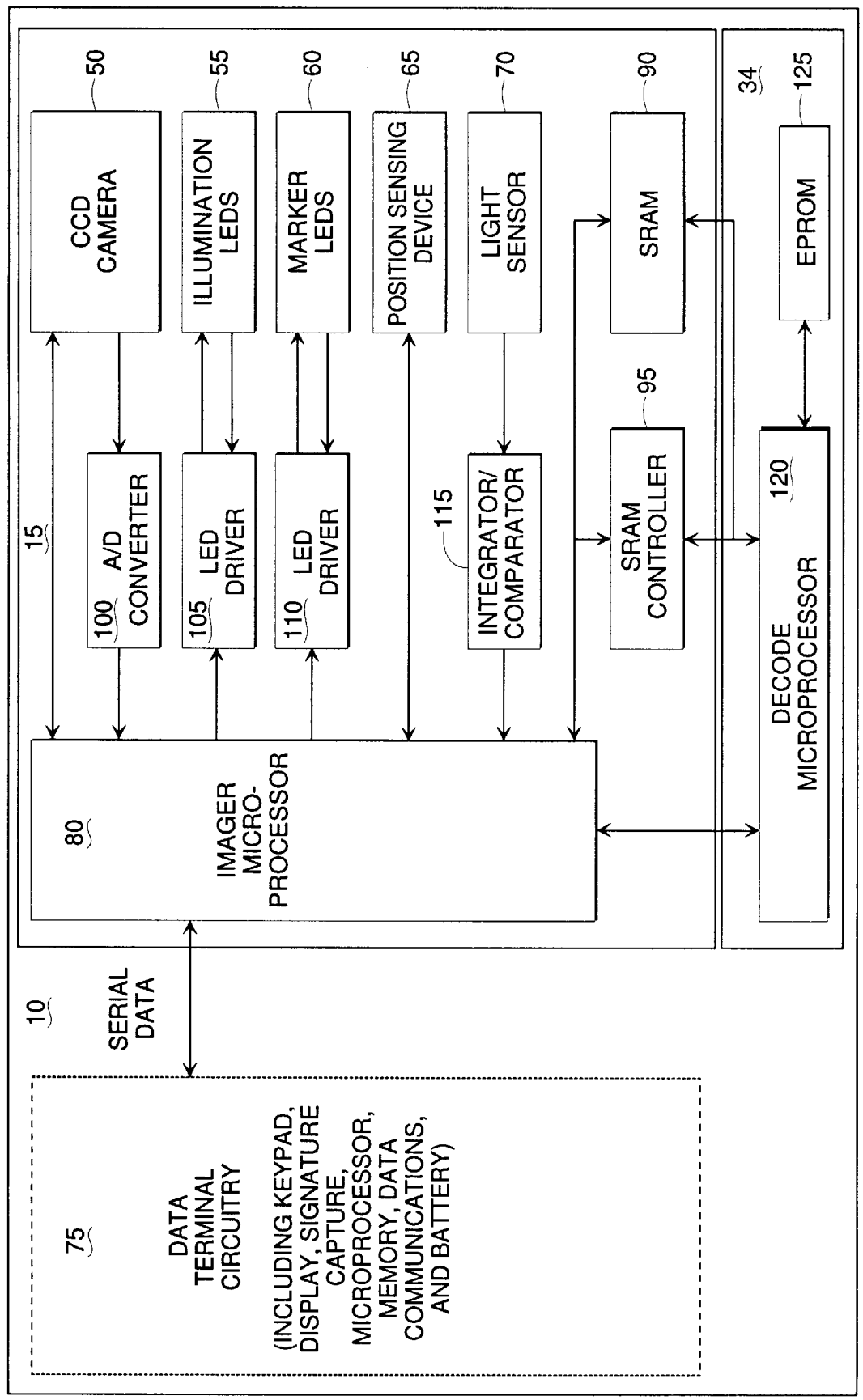
FIG. 4 is a block diagram of the circuitry employed in the preferred embodiment of the non-contact label imager of the present invention.
Figure 5:
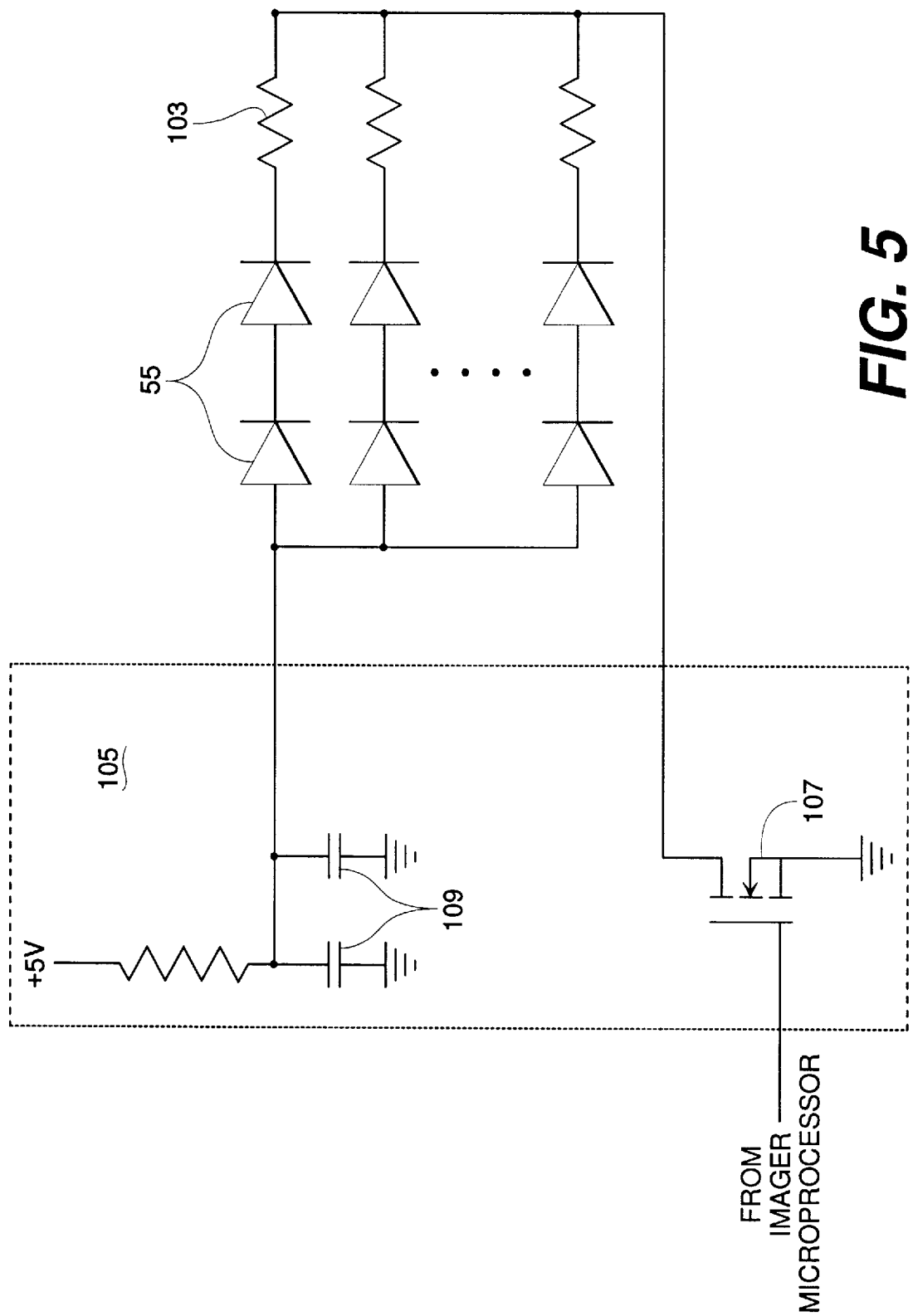
FIG. 5 is a schematic diagram of the circuitry used to drive the illumination light emitting diodes.

FIGS. 2–5 illustrate the primary components of the preferred label imager 15, which forms a part of the portable data terminal 10. FIG. 2 is a bottom plan view of the portable data terminal 10, and illustrates the mechanical configuration of the components. FIG. 3 is an isometric view of portion of the interior of the portable data terminal 10, looking at the bottom of the terminal. FIG. 4 is a schematic diagram illustrating the connections between the label imager 15, the decoder 34, and the portable data terminal 10. FIG. 5 is a schematic diagram of the circuitry used to drive the light emitting diodes that illuminate the target label.

The primary component of the label imager 15 is a charge coupled device (CCD) camera 50, which is mounted in the upper center portion of the data terminal's bottom surface. The CCD camera 50, which includes a CCD array, optics and associated electronic circuitry, is operative for capturing an image of a label, and providing an analog output corresponding to the image. A plurality of illumination light emitting diodes (LEDs) 55 are arranged to form an array with the CCD camera 50 at its center. The illumination LEDs 55 are turned on during the CCD camera's exposure period in order to ensure that the label is properly illuminated. The CCD camera 50 provides a variable exposure time (electronic shutter speed). The electronic shutter speed is selected so that the captured image is properly exposed, and so that the exposure is not blurred due to movement of the data terminal 10 during the exposure. This operation is described more completely below in conjunction with FIG. 6.

Four marker LEDs 60 are mounted at the corners of the illumination LED array. The marker LEDs 60 provide aiming indicia that allow the data terminal user to properly aim the CCD camera 50 at the label. Each of the marker LEDs 60 emits an approximately collimated beam of light that projects a dot onto a surface below the data terminal 10. The dots correspond to the corners of the CCD camera's rectangular field of view. This allows the user to manipulate the data terminal so that the area defined by the dots encompasses the target label.

A position sensing device 65, which includes an emitter 66 and a detector 67, is mounted adjacent the CCD camera 50. The position sensing device 65 detects the distance between the package and the data terminal 15 as the user is in the process of aiming the data terminal's CCD camera 50. When the position sensing device indicates that the distance between the package and the data terminal is within a predetermined range of distances, a proper shutter speed is set and the CCD camera 50 captures an image of the package label. Those skilled in the art will appreciate that the proper distance between the data terminal and the package must be established in order to ensure that the image is in focus at the CCD camera, and that the size of the image captured by the CCD camera 50 is neither too large for the CCD array, nor too small to be accurately decoded by the decoding algorithm.

In order to determine the proper shutter speed for the CCD camera 50, a light sensor 70 is mounted above the CCD camera 50. The light sensor 70 is used to measure the amount of light reflected from the label before the label image is captured. Immediately prior to capturing the label image, the illumination LEDs 55 are turned on and the amount of reflected light is measured by the light sensor 70. The shutter speed of the CCD camera 50 is then adjusted so that the amount of light measured by the light sensor will result in the proper exposure.

Those skilled in the art will appreciate that, in an alternative embodiment, the amount of reflected light can be determined without requiring a separate light sensor. In an alternative method, the reflected light may be determined by using the CCD camera to take a preliminary exposure of the label image. For the preliminary exposure, the shutter speed is set to a predetermined time period, and the captured image data is analyzed by the microprocessor in order to determine the shutter speed that will result in the label image being properly exposed. A method for using a CCD camera to take a preliminary exposure of a label is disclosed in co-pending U.S. patent application Ser. No. 08/328,660, entitled "Automatic Electronic Camera For Label Image Capture," which is filed concurrently herewith, and commonly assigned (hereinafter referred to as the "Automatic Electronic Camera application"). The disclosure of the Automatic Electronic Camera application is incorporated herein by reference and made a part hereof.

As more clearly illustrated in the isometric view of FIG. 3, the label imager 15 includes a top printed circuit board 71 and a bottom printed circuit board 72. The printed circuit boards are mounted on standoffs 73 that extend from the interior surfaces of the data terminal case. The top printed circuit board 71 is mounted to the bottom circuit board using spacers 74. Grommets 76 are used to reduce the amount of vibration and shock that is transferred from the data terminal's case to the CCD camera. The rubber grommets 76 are bonded to the printed circuit boards and mounted on the standoffs. A portion of the top printed circuit board 71 has been cut away to show the relative positions of the other components.

The position sensing device 65 and the light sensor 70 are mounted to the top printed circuit board 71. The CCD camera 50 is mounted to the bottom printed circuit board 72. A portion of the CCD camera 50 extends through a hole in the top printed circuit board 71. The marker LEDs 60 and illumination LEDs 55 are also mounted to the top printed circuit board 71. However, only a few of the illumination LEDs 55 are shown in FIG. 3 in order to avoid obscuring the view of the other components.

FIG. 4 is a schematic diagram illustrating the electrical connections between various components that are included in the portable data terminal 10. Generally described, the portable data terminal 10 includes data terminal circuitry 75 and the circuitry associated with the label imager 15 and the decoder 34. The data terminal circuitry 75 implements the primary data acquisition functions of the data terminal 10. As mentioned above, these functions include acquiring and displaying shipping related data via a keypad, display and signature pad. The circuitry includes a microprocessor suitable for controlling the functions of the data terminal 10, memory for storing programs and shipping data, and a rechargeable battery. The data terminal circuitry 75 also includes data communications hardware that allows data to be conveyed to and from the data terminal 10.

The label imager 15 is designed so that the interface between the label imager 15 and the data terminal circuitry 75 is very straightforward and easy to implement. The data terminal circuitry 75 and the imager 15 are connected to each other by means of a bidirectional serial data interface. The data terminal provides a "start signal" in response to the actuation of a button on the data terminal's keypad. The start signal is received by the label imager's microprocessor 80, which controls the operation of the CCD camera 50 and other components, and the interface with the data terminal circuitry 75. After the start signal is received by the imager microprocessor 80, the label imager captures the label information indicia and provides the digital image data to the decoder 34. After the image data is decoded, the label imager provides a response to the data terminal circuitry 75 in the form of serial data. If the label capture and decode operations are successful, the label imager provides the decoded label data to the data terminal circuitry, where the label data is then used and/or stored in conjunction with other related shipping data. If the image capture and decode operations are not successful, the label imager 15 will return an error code to the data terminal circuitry 75.

The preferred imager microprocessor 80 is a type 87C51, manufactured by Signetics. The imager microprocessor 80 includes 4 Kbytes of internal read only memory (ROM) for application code storage. The imager also includes random access memory (RAM) 90 for data storage, including storage of digitized camera data and decoded label data. The preferred RAM 90 is a type HM628512 static RAM, manufactured by Hitachi. The RAM 90 provides 512 Kbytes of storage. A type EPM7032 static RAM (SRAM) controller 95, manufactured by Altera, is used to interface the imager microprocessor 80 to the RAM 90.

In the preferred label imager 15, the CCD camera 50 is a type CCB-M37CE CCD camera, manufactured by Sony Corporation. The CCD camera includes a 7.5 millimeter (mm) lens, which provides a wide field of view of approximately 53° (horizontal) by 41° (vertical). The size of the image is 4.89 mm (H) by 3.64 mm (V). The object distance for ideal focus is 149 mm. At this distance, the camera has a field of view of approximately 141 mm (H) by 105 mm (V) (5.54"×4.13"). A fixed aperture of f/8 provides a depth of field of approximately ±50 mm.

In addition to the focusing optics, the camera includes a narrow band pass filter that is spectrally matched to the wavelength of the illumination LEDs. A similar filter is positioned in front of the light sensor. Those skilled in the art will appreciate that the band pass filters allow the camera and light sensor to filter out most of the ambient light while remaining sensitive to the light used to illuminate the target label. Due to decreased light transmission for off-axis light rays, which is characteristic of narrow band pass filters, pixel values would have to be weighted during the decode process in order to compensate for the decreased image brightness around the field of view of the image. Those skilled in the art will understand that the necessary pixel weighting can be accomplished in the software that implements the digital image data decoding algorithm.

The CCD camera 50 uses a single field of a high resolution CCIR format CCD imaging array. The CCD camera provides an image field of 752 (H) by 291 (V) pixels, with each pixel measuring approximately 6.5 microns (H) by 12.5 microns (V). This provides a resolution in the object plane of 136.5 dpi (H) by 70 dpi (V) at the ideal focusing distance of 149 mm. The resolution at angles other than vertical or horizontal are the vector sums of the vertical and horizontal resolutions. In order to decode a label with elements measuring 15 mils, the resolution must be at least 100 dpi. Therefore, the preferred CCD camera 50 will provide adequate resolution when the horizontal axis of the label is within 62.4° of the horizontal axis of the camera.

The CCD camera 50 is connected the imager microprocessor 80 in a manner known to those skilled in the art. The connections between the imager microprocessor 80 and CCD camera 50 allow the imager microprocessor to receive timing signals, such as a vertical synchronization signal, from the CCD camera. The connections also allow the imager microprocessor to control various camera parameters, such as the electronic shutter speed. The analog video output signal from the CCD camera 50 is provided to an analog-to-digital (A/D) converter 100, which, in the preferred label imager, is a type BT252, manufactured by Brooktree. The digitized video data from the A/D converter is then stored in the RAM 90, where it is available to be decoded by the decoder 34. The operation of the CCD camera 50, and the interaction between the CCD camera and the imager microprocessor is described more completely below in conjunction with FIG. 6.

Illumination for the CCD camera 50 is provided by an array consisting of 188 light emitting diodes 55. The preferred illumination LEDs 55 are type HLMP-8100, manufactured by Hewlett-Packard. The light emitted by the illumination LEDs is deep red, with a wavelength of approximately 650 nanometers (nm). This wavelength is preferred because the ink used to print most labels is chosen to work with laser bar code scanners whose wavelengths lie between 630 nm and 680 nm. In addition, the human eye is much less sensitive to these wavelengths and a burst of deep red light is perceived to be much dimmer than a burst of white light of the same energy. Red light also has less effect on the night vision of the user.

Alternatively, the illumination may be provided by as few as 16 illumination LEDs that are configured to form a ring around the CCD camera's lens. In this configuration, a suitable dispersing lens is needed to ensure that the target label area is adequately illuminated. A suitable circular LED configuration and dispersing lens are described below in conjunction with FIGS. 11A and 11B.

FIG. 5 illustrates the preferred circuitry for driving the illumination LEDs 55. In the preferred label imager 15, the illumination LEDs 55 are mounted on the top printed circuit board, along with current limiting resistors 103. The illumination LEDs 55 are controlled by the imager microprocessor 80 via the LED driver 105, which includes a field effect transistor (FET) 107 and associated circuitry. The preferred FET 107 is a type IRFF130 MOSFET, manufactured by International Rectifier. When the FET 107 is turned on by the imager microprocessor, it provides a large amount of current to the LEDs 55 from the battery and two 4700 µF charge capacitors 109. The charge capacitors 109 help maintain a steady supply voltage while the LEDs are on.

To ensure that the user aims the data terminal 10 so that the target label is located within the CCD camera's field of view, marker LEDs 60 are used to provide aiming indicia that are projected onto the surface that contains the label. The preferred marker LEDs 60 are type HLMP-8103, manufactured by Hewlett-Packard. Four marker LEDs are located at the corners of the illumination LED array. The marker LEDs project spots that correspond to the corners of the camera's field of view. The light emitted by the marker LEDs is bright red, with a wavelength of 650 nm. The marker LEDs provide four spots on the label. The spots delineate the boundaries of the rectangular image plane. Like the illumination LEDs 55, the marker LEDs 60 are controlled by the imager microprocessor 80, and are connected to the imager microprocessor via LED driver 110.

The position sensing device 65 is used to ensure that the label image is captured when the label is within the CCD camera's depth of field. The preferred position sensing device 65 is a type GP2D02 infrared range finder, manufactured by Sharp. The range finder 65, which is controlled by the imager microprocessor 80, includes an emitter 66 and detector 67. When the range finder receives a synchronization signal from the imager microprocessor, the emitter emits a burst of infrared light. The receiver detects the incident angle of the infrared light that is reflected from the target surface, and calculates the distance using a triangulation scheme technique. The range finder then provides digital distance data to the imager microprocessor. The interaction between the range finder and the other components is described below in conjunction with FIG. 6.

The imager microprocessor 80 determines the proper shutter speed for the CCD camera 50 in response to light measurements provided by the light sensor 70. The preferred light sensor 70 is a type TSL250 flash sensor, manufactured by Texas Instruments. The light sensor provides an output voltage that is directly proportional to the amount of light detected by the light sensor. Before output of the light sensor is provided to the imager microprocessor, it is passed through a integrator/comparator 115. The preferred integrator/comparator includes a type TLC272 integrator, manufactured by Texas Instruments, and a type LM393 comparator manufactured by National Semiconductor. The integrator/comparator takes the light sensor's output voltage and integrates it over a fixed amount of time, which is typically 1 millisecond (msec). The exposure is represented by the product of the voltage and time. The interaction between the light sensor 70 and imager microprocessor 80 is described more completely below in conjunction with FIG. 6.

The decoder 34 includes a decode microprocessor 120 and an electronically erasable programmable read only memory (EPROM) 125. The decode microprocessor 120 is a type R3081 microprocessor, manufactured by Integrated Device Technologies. The EPROM 125 is a type AT29LV010-20TC EPROM, manufactured by Atmel.

The RAM 90 is shared by the imager microprocessor 80 and the decode microprocessor 120. Accordingly, the decode microprocessor 120 is connected to the RAM 90 and SRAM controller 95 so that it is able to read data from and write data to the RAM 90. More particularly, the decode microprocessor 120 reads the stored digital image data from the RAM and decodes the digital image data to provide decoded data. The decode algorithm that is applied by the decode microprocessor is stored in the EPROM 125.

The decode microprocessor 120 is also connected to the imager microprocessor 80 so that they communicate with each other via serial data. This allows the imager microprocessor 80 to signal the decode microprocessor 120 when the digital image data has been stored in the RAM 90. After the decoder decodes the image data, the serial data interface between the microprocessors is used to allow the decode microprocessor 120 to transmit the decoded data to the imager microprocessor 80. The imager microprocessor also controls circuitry (not shown) that controls the supply of power to the decode microprocessor. In order to conserve battery power, power is applied to the decode microprocessor 120 only when image data is being decoded.

Those skilled in the art will understand that from time to time it may be necessary or advantageous to update the code contained in the EPROM 125. For example, the decode algorithm may be updated to provide improved decoding algorithms as they are developed. In the preferred data terminal, the serial interface between the imager microprocessor and the decode microprocessor are used in conjunction with the shared RAM 90 to update or reprogram the EPROM 125. This is accomplished by providing the appropriate command and data to the data terminal via the terminal's serial port. The data terminal circuitry 75 passes the new program data to the image microprocessor 80, which stores the data in the shared RAM 90. After ensuring the accuracy of the program data, the imager microprocessor indicates to the decode microprocessor that the EPROM is to be reprogrammed and that the new program data is available in the RAM at a specified address. The decode microprocessor then applies the required signal to erase the EPROM, and reprograms the EPROM using the data from the RAM.

Figure 6:
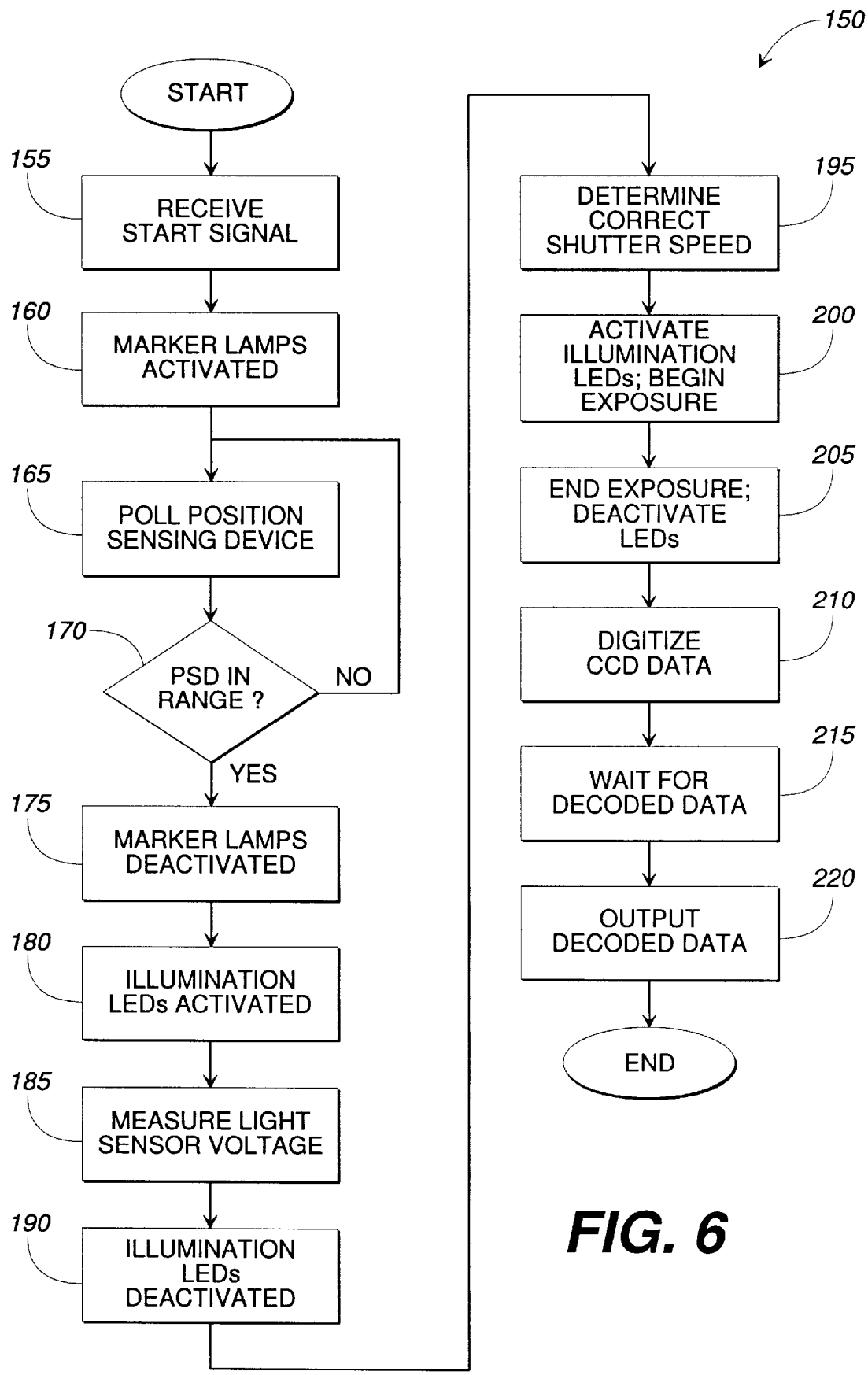
FIG. 6 is a flow chart illustrating the preferred method of operating the preferred non-contact label imager of the present invention.

The preferred method of operating the label imager 15 is illustrated in the flow chart of FIG. 6. Those skilled in the art will understand that the preferred method 150 is implemented as program code for the imager microprocessor 80. The program code is stored in the microprocessor's built-in EPROM.

The method 150 begins at step 155 when the label imager's microprocessor 80 receives a start signal from the data terminal circuitry. After the imager microprocessor 80 receives the start signal from the data terminal circuitry, the method proceeds to step 160, where the imager microprocessor activates the marker LEDs 60. As described above, the marker LEDs provide visible aiming indicia that allow the user to aim the camera at the information indicia on the target label.

At step 165, the imager microprocessor polls the position sensing device 65 to determine whether the surface at which the camera is aimed is within the camera depth of field. This is accomplished by sending a synchronization signal to the infrared range finder. The range finder then determines the distance to the surface and returns digital distance data to the imager microprocessor. At step 170, the imager microprocessor determines whether the digital distance data from the position sensing device indicates that the label is within a predetermined range of distances. If not, the method returns to step 165 and again polls the position sensing device.

If the label is within the CCD camera's depth of field, the method proceeds to step 175, where the imager microprocessor deactivates the marker LEDs. Those skilled in the art will appreciate that the marker LEDs and position sensing device are used in conjunction with each other to ensure that the camera is aimed at the proper portion of the label, and that the label is within the camera's depth of field. If either condition is not satisfied, the attempt to read and decode the information indicia will be unsuccessful.

After the marker LEDs are deactivated, the imager microprocessor determines the proper shutter speed for the CCD camera by measuring the amount of light reflected from the label. At step 180, the imager microprocessor activates the illumination LEDs 55. At step 185, the imager microprocessor measures the voltage from the light sensor 70. The light sensor voltage, which corresponds to the amount of light reflected from the label surface to the CCD camera, is then used by the imager microprocessor to determine the proper shutter speed. Those skilled in the art will understand that the light measured by the light sensor includes ambient light and light from the illumination LEDs. Once the light sensor is read, the method proceeds to step 190, where the imager microprocessor deactivates the illumination LEDs. In the preferred label imager, the steps of activating illumination LEDs, measuring light sensor voltage, and deactivating illumination LEDs takes approximately 1 msec.

At step 195, the imager microprocessor uses the output voltage from the light sensor to determine the correct shutter speed for the CCD camera. Those skilled in the art will appreciate that this may be accomplished by using a pre-programmed look up table, or by using a known equation. In the preferred imager, the imager microprocessor uses the following equation to determine the correct shutter speed:

$$\text{EXPOSURE} = \text{VOLTAGE} \times \text{SHUTTER SPEED}$$

In this equation, the exposure is a constant that has been determined to provide a suitable exposure. The shutter speed will be no less than 0.1 msec in order to minimize CCD smear. Likewise, the shutter speed will be no greater than 4.0 msec in order to sufficiently minimize blur resulting from a moving label or shaking data terminal. After the shutter speed is determined, the method proceeds to capture the label image.

As mentioned above, in an alternative embodiment, the amount of reflected light can be determined by using the CCD camera to take a preliminary exposure of the label image. The captured image data is analyzed by the imager microprocessor in order to determine the shutter speed that will result in the label image being properly exposed.

At step 200, the imager microprocessor begins the exposure that will capture the label image. Those skilled in the art will understand that the exposure must be coordinated with timing signals generated by the CCD camera. After the imager microprocessor detects the occurrence of the appropriate vertical synchronization signal, the imager microprocessor delays for a period of time equal to (20 msec—shutter speed). At that time, the illumination LEDs are turned on and the exposure begins.

After the exposure time, which equals the shutter speed, has elapsed, the method proceeds to step 205, where the imager microprocessor ends the exposure and turns off the illumination LEDs. At that point the method advances to step 210, where the analog pixel data from the CCD camera is digitized by the A/D converter 100. The digital image data from the A/D converter 100 is stored in the RAM 90, where it is available to be decoded by the decoder 34. The imager microprocessor 80 signals the decode microprocessor 120 to indicate that the digital image data has been stored in the RAM.

At step 215, the imager microprocessor 80 waits while the decode microprocessor 120 decodes the digital image data that is stored in the RAM 90. The decode microprocessor begins the process of decoding the digital data after it receives a signal from the imager microprocessor 80. This signal is provided via the serial data interface that connects the imager and decode microprocessors.

The decoding of the stored digital image data is accomplished by applying a stored decoding algorithm to the digital image data. Those skilled in the art will appreciate that the decoding algorithm must be designed for the particular information indicia that was captured by the CCD camera. Therefore, if the label imager is to be used to read bar codes, the appropriate bar code decoding algorithm must be stored in the decoder's EPROM 125. Likewise, if the data terminal will be used in conjunction with package bearing two-dimensional symbologies, the appropriate decoding algorithm must be provided in the decoder. Those skilled in the art will appreciate that the information indicia captured by the CCD camera are not limited to bar codes and two-dimensional symbologies, but may also include printed or hand-written text that is readable by optical character recognition (OCR) techniques. It is possible to provide a plurality of decoding algorithms so that the data terminal can be used to read and decode any of a wide variety of various information indicia.

Those skilled in the art will also appreciate that several steps may be required to decode the digital image data. For example, the decode algorithm will first need to determine whether the captured image includes a recognizable type of information indicia. If so, the algorithm may need to determine the orientation of the information indicia, and, if necessary, rotate the data to align the information indicia with a desired axis. After all the necessary steps are accomplished and the digital image data is decoded, the decoded data is transmitted to the imager microprocessor 80 from the decoder 34 via the serial data interface that connects the imager and decode microprocessors, and the method proceeds to step 220.

At step 220, the imager microprocessor 80 outputs the decoded image data to the data terminal circuitry. As described above, the decoded output data is provided in the form of serial data. If, for some reason, the decode microprocessor 120 is unable to detect and decode a label information indicia in the captured image, the imager microprocessor 80 will provide an error code to the data terminal circuitry at step 220. Those skilled in the art will understand that the label imager 15 and decoder 34 may be unable to detect and decode an information indicia for a variety of reasons, including the camera was not aimed at the appropriate part of a label, the label was not within the camera's depth of field, and the decoder was not programmed to decode the particular label information indicia that was captured by the imager.

After the decoded image data or error code is provided at step 220, the method 150 returns to the idle state until another start signal is received from the data terminal circuitry.

Figure 7:
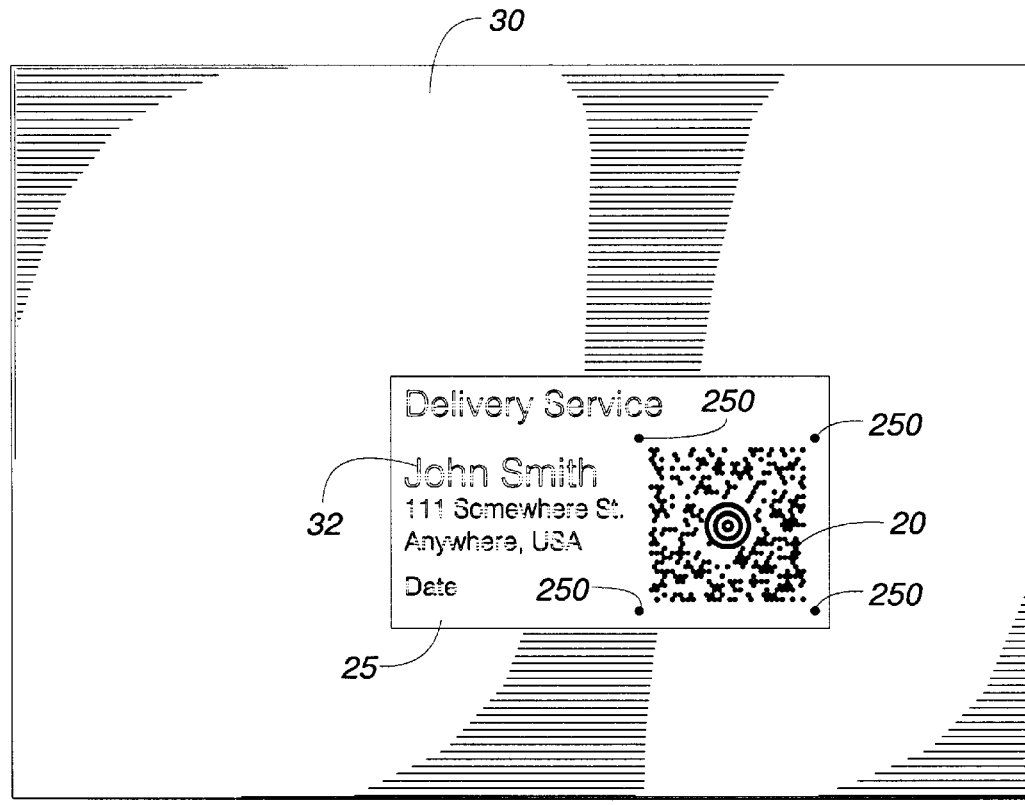
FIG. 7 is a top plan view of a label on a package illustrating the pattern formed by the marker LEDs of FIG. 2.

FIG. 7 is a top plan view of the package 30 showing the aiming indicia 250 that are provided by the marker LEDs 60. The top surface of the package 30 includes a label 25 having a two-dimensional code 20 and alphanumeric characters 32 printed thereon. The preferred aiming indicia include four bright spots projected by the four marker LEDs. The aiming indicia 250 correspond to the corners of the CCD camera's field of view. This allows the user to move the portable data terminal so that the two-dimensional code 20 is located within the CCD camera's field of view.

Figure 8:
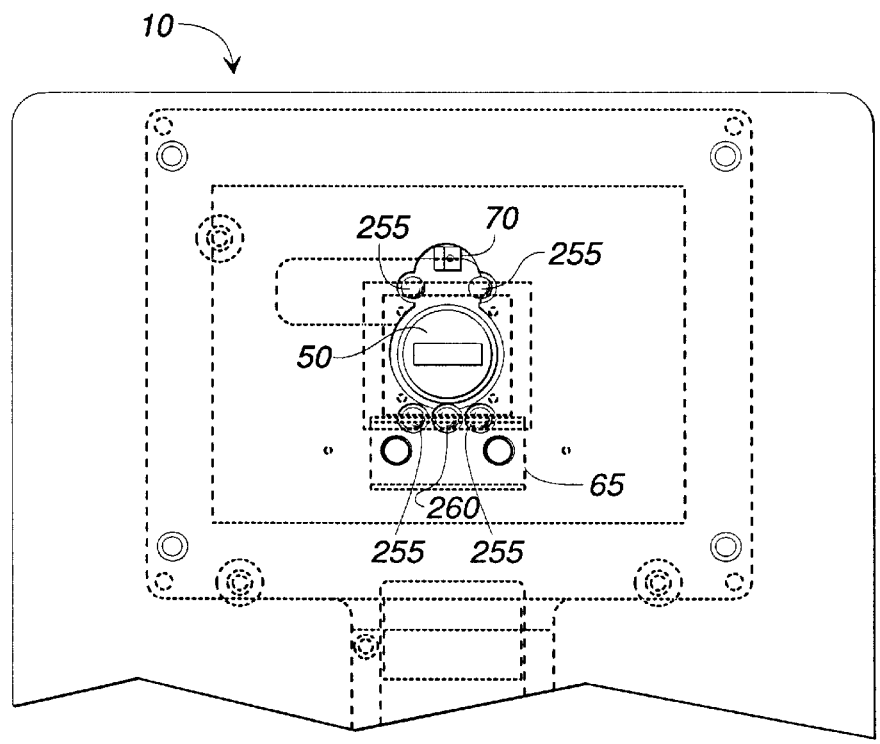
FIG. 8 is a bottom plan view of the portable data terminal of FIG. 1, illustrating an alternative embodiment including laser diodes for illuminating the label, and a line generator to provide a target indicator.

FIG. 8 is bottom plan view of the portable data terminal 10 showing an alternative embodiment of the label imager 15. In this embodiment, four illuminating laser diodes 255 replace the illumination LEDs of FIG. 2. In addition, a line generator 260 replaces the marker LEDs of FIG. 2.

Illuminating laser diodes 255 provide a suitable way for illuminating a package label. The preferred illuminating laser diodes include four type MPM3G-N laser diodes, manufactured by Power Technology Inc. The preferred laser diodes are very bright and provide satisfactory illumination for the CCD camera when they are used with suitable dispersing lenses. The preferred line generator 260, which includes a laser diode and a cylindrical lens, is a type VLM3LG-04, manufactured by Applied Laser Systems. The line generator 260 is mounted so it projects a light beam downward toward the target label. When the light beam strikes the label, it forms aiming indicia 265, which is illustrated in FIG. 9.

Figure 9:
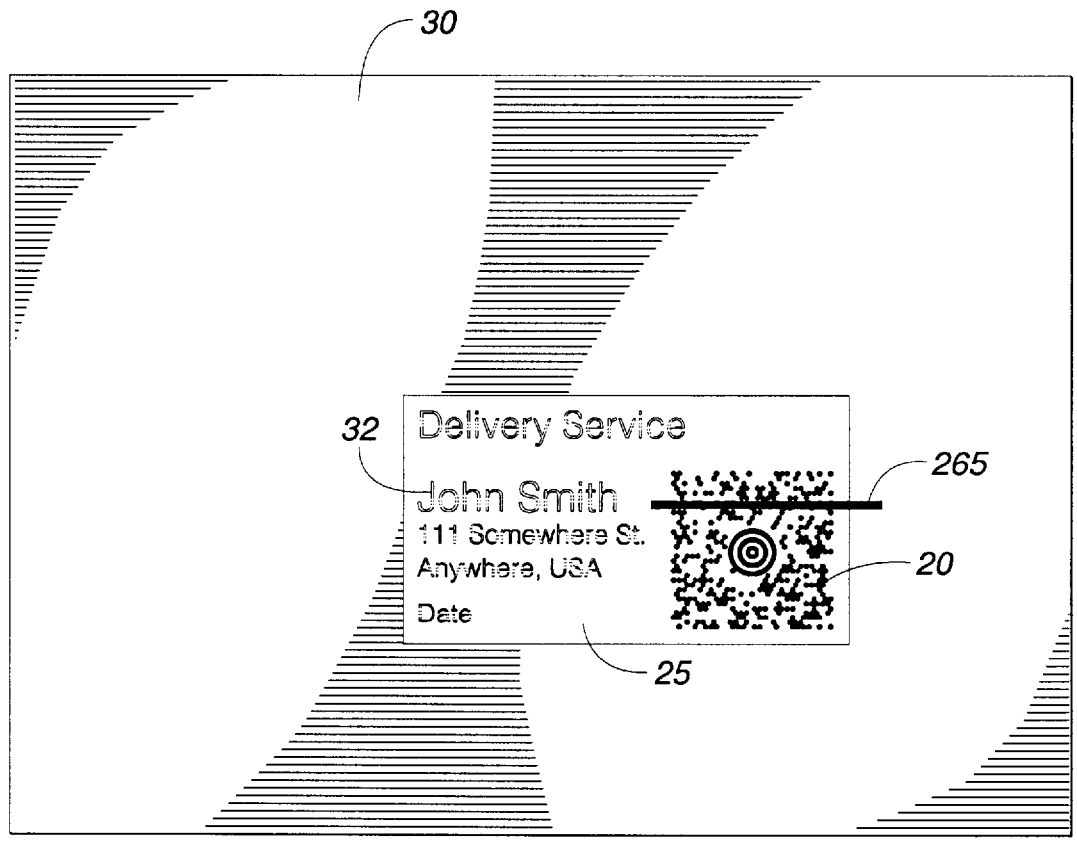
FIG. 9 is a top plan view of a label on a package illustrating the pattern from the line generator of FIG. 8.

FIG. 9 provides a top plan view of a package 30 showing a label 25, two-dimensional bar code 20, and the aiming indicia 265 produced by the line generator 260. The aiming indicia 265 is similar to the pattern produced by laser bar code scanners. However, the fixed optics used with the laser diode produces a line segment without requiring any moving parts.

Figure 10:
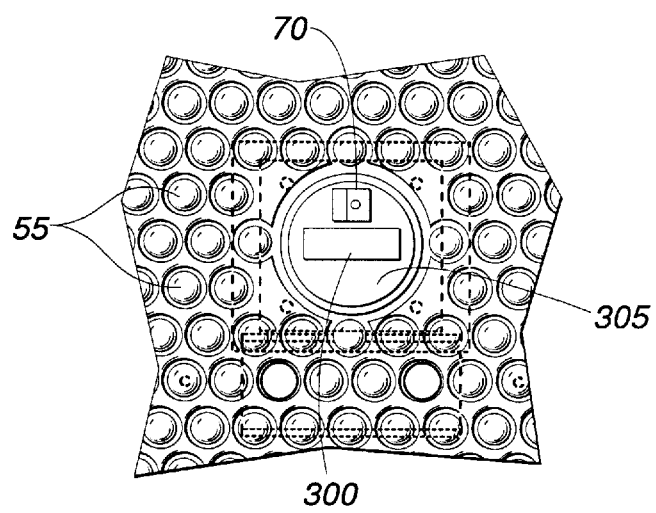
FIG. 10 is a partial bottom plan view of the portable data terminal of FIG. 1, illustrating an alternative location for the light sensor adjacent the CCD array.

FIG. 10 is a partial bottom plan view of the portable data terminal, illustrating an alternative location for the light sensor 70. In this embodiment, the light sensor is located adjacent a CCD array 300, beneath a lens 305. The illumination LEDs 55 are positioned in an array around the CCD array. By placing the light sensor 70 immediately adjacent the CCD array, the amount of light measured by the light sensor will most accurately reflect the amount of light falling on the CCD array. This will result in the shutter speed being calculated as accurately as possible.

Figure 11A:
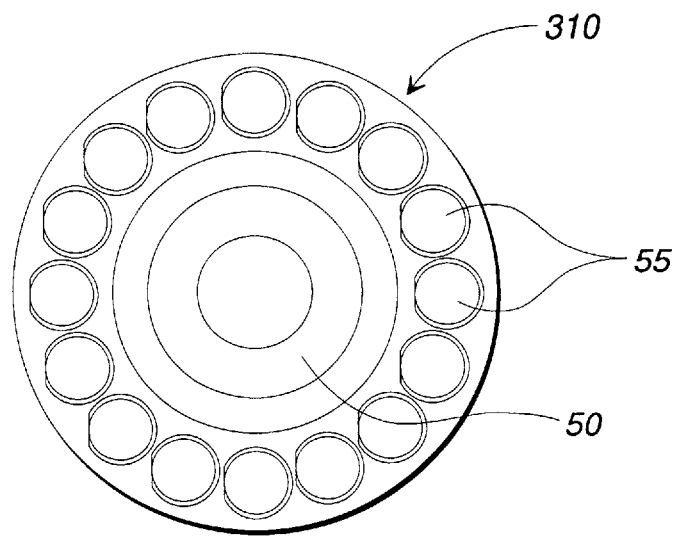
FIGS. 11A and 11B illustrate an alternative illuminator that employs a circular LED arrangement.
Figure 11B:
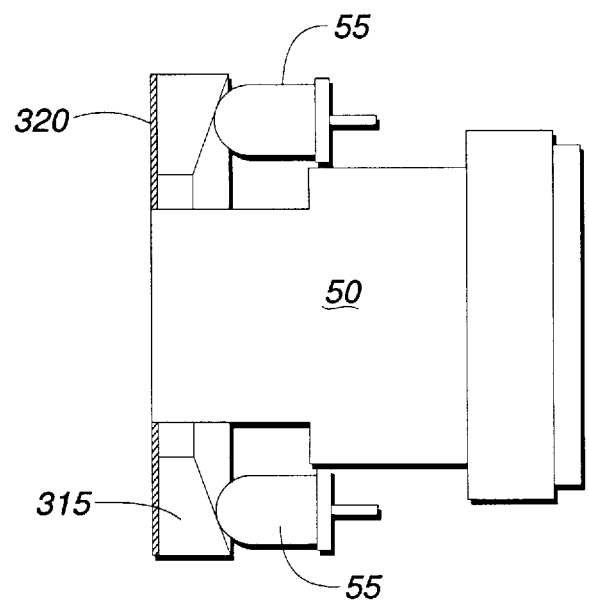

FIGS. 11A and 11B illustrate an alternative, circular illuminator 310 in which the illumination LEDs 55 are arranged to form a ring about the camera 50. The circular illuminator 310 is a circular array of 16 LEDs. The LEDs face straight forward and are placed behind a piano-concave dispersing ring lens 315 and polarizing filter 320. The camera lens is located at the center of the circular LED array.

The dispersing ring lens 315 is constructed from a clear piece of polycarbonate rod. The center is removed to provide viewing for the camera. Material on the inner face is removed until the inner face is at a 20° angle to the outer face, which is flat. The ring is as thin as possible. Both faces are polished. The outer face is highly polished in order to bond to the polarizing filter 320. The inner surface is left slightly diffuse. The diameter of the LED ring is 1.1875 inches. At this diameter, a 20° ring of polycarbonate, which has a refractive index of 1.59, approximates the effect of a planoconvex lens with a focal length of −4.4". The dispersing ring is as small as possible around the lens. This approximates a light source that is coincident with the camera lens itself. The result is the smallest possible variation in the illumination pattern when the object position is changed. Alternatively, this ring may be replaced by a negative focal length fresnel lens.

Each LED's 35° beam pattern is bent away from the center by approximately 11.5° and the circular pattern is stretched into an ellipse. These elliptical patterns are diffuse due to the inner surface of the dispersing ring being less polished. The sum of these diffuse elliptical patterns is the total pattern which has little local variation and is fairly consistent from center to edge.

The light from the LEDs is polarized by the polarizing filter 320 so that direct reflections from a glossy surface (i.e. clear plastic or the front surface of slick paper) can be discriminated from diffuse reflection from dull surfaces (i.e. paper label) by the use of a separate orthogonal polarizing filter (not shown) in the lens. Cross-polarization of the LED Illuminator and lens reduces glare from the LED Illuminator. The contrast of the label elements is greatly increased by the use of polarizing filters when observing labels with shiny surfaces. Additional details regarding a suitable circular illuminator are provided in the above referenced Automatic Electronic Camera application.

From the foregoing description, it will be understood that present invention provides method and apparatus for a portable non-contact label imager. The present invention aids the user in aiming the camera at the target label, and ensures that the label is within the camera's depth of field.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for operating a non-contact imager for automatically determining whether a surface is within the operating range of the imager and for capturing an image of information indicia on the surface when the surface is within the operating range of the imager, comprising the steps of:

receiving a user-initiated start signal;

in response to said user-initiated start signal, determining if the distance between said imager and said surface is within a predetermined range of distances, said predetermined range of distances corresponding to the operating range of the imager;

in response to said surface not being within said predetermined range of distances, again determining if the distance between said imager and said surface is within said predetermined range of distances; and in response to said surface being within said predetermined range of distances, performing the steps of:
determining a proper shutter speed for said imager;
obtaining an image of said information indicia using said proper shutter speed, thereby providing image data; and
providing output data corresponding to said image data.

2. The method of claim 1, further comprising the steps of:

activating aiming indicia providing means in response to said user-initiated start signal; and deactivating said aiming indicia providing means in response to said surface being within said predetermined range of distances.

3. The method of claim 1, wherein the step of determining the proper shutter speed comprises the steps of:

activating an illumination source;

measuring the amount of light present at said imager;

deactivating said illumination source; and determining, in response to the amount of light measured at said imager, the proper shutter speed required for said imager.

4. The method of claim 3, wherein the step of measuring the amount of light comprises measuring a voltage provided by a light sensor.

5. The method of claim 3, wherein the step of measuring the amount of light comprises:

capturing an image of said information indicia during a preliminary exposure; and analyzing said captured image.

6. The method of claim 1, wherein the step of obtaining an image of said information indicia further comprises the steps of:

activating an illumination source;

exposing said imager to said information indicia, said information indicia being illuminated by said illumination source; and deactivating said illumination source.

7. The method of claim 1, wherein said aiming indicia providing means provides a plurality of dots projected on said surface and indicating the field of view of said imager.

8. The method of claim 1, further comprising the step of decoding said image data to provide said output data, and wherein said output data comprises alphanumeric data.

9. A non-contact imager for automatically capturing information indicia located on a surface when the surface is within the operating range of the imager, the imager comprising:

a camera for reading said information indicia, said camera including an adjustable speed shutter and a fixed focus lens assembly;

means for providing aiming indicia on said surface, said aiming indicia corresponding to the field of view of said camera;

a range finder operative for determining the distance between said imager and said surface;

an illumination source for illuminating at least a portion of said surface, said illuminated portion including said information indicia;

a controller operatively connected to said camera, said aiming indicia providing means, said range finder, and said illumination source, said controller being configured to:

receive a user-initiated start signal;

activate said aiming indicia providing means;

in response to said user-initiated state signal, determine whether the distance between said imager and said surface is within a predetermined range of distances, said predetermined range of distances corresponding to said operating range of said imager;

in response to said distance between said imager and said surface not being within said predetermined range of distances, determine whether said distance between said imager and said surface is within a predetermined range of distances; and in response to said distance between said imager and said surface being within said predetermined range of distances, deactivate said aiming indicia providing means;

determine a proper shutter speed for said camera; and capture an image of said information indicia using said camera set at said proper shutter speed, thereby providing image data.

10. The non-contact imager of claim 9, further comprising a light sensor for measuring light reflected from said surface, said light sensor being operatively connected to said controller, and wherein said controller is configured to determine said proper shutter speed by:

activating said illumination source;

measuring the amount of light present at said light sensor;

deactivating said illumination source; and determining, in response to the amount of light measured at said light sensor, said proper shutter speed for said camera.

11. The non-contact imager of claim 10, wherein said illumination source comprises at least one light emitting diode.

12. The non-contact imager of claim 9, wherein measuring the amount of light comprises measuring a voltage provided by said light sensor.

13. The non-contact imager of claim 9, wherein said controller is configured to determine said proper shutter speed by:

activating said illumination source;

determining the amount of light present at said camera during a preliminary exposure;

deactivating said illumination source; and determining, in response to the amount of light measured at said camera, said proper shutter speed for said camera.

14. The non-contact imager recited in claim 9, wherein said controller is configured to capture an image of said information indicia by:

activating said illumination source;

exposing said camera to said information indicia, said information indicia being illuminated by said illumination source; and deactivating said illumination source.

15. The non-contact imager recited in claim 9, wherein said imager is associated with a portable data terminal.

16. The non-contact imager recited in claim 15, wherein said portable data terminal comprises a keypad, a display, and a signature capture pad.

17. The non-contact imager recited in claim 9, further comprising a decoder for providing output data corresponding to said image data, and wherein said output data comprises alphanumeric data.

18. A portable data terminal for automatically reading information indicia located on a surface in response to a start signal, the terminal comprising:

a communications port for communicating output data to a computer;

a camera for reading said information indicia, said camera including an adjustable speed shutter;

means for providing aiming indicia on said surface, said aiming indicia corresponding to the field of view of said camera;

a range finder operative for determining the distance between said portable data terminal and said surface;

an illumination source for illuminating at least a portion of said surface, said illuminated portion including said information indicia;

means for generating a start signal in response to user input;

a controller operatively connected to said camera, said aiming indicia providing means, said range finder, said illumination source, and said start signal generating means, said controller being configured to:

receive said start signal;

in response to said start signal, determine if the distance between said portable data terminal and said surface is within a predetermined range of distances corresponding to the operating range of said camera;

in response to said distance between said portable data terminal and said surface not being within said predetermined range of distances, repeating the step of determining if said distance between said portable data terminal and said surface is within said predetermined range of distances; and in response to said distance between said portable data terminal and said surface being with said predetermined range of distances, to determine a proper shutter speed for said camera; and capture an image of said information indicia using said camera set at said proper shutter speed, thereby providing image data.

19. The portable data terminal of claim 18, wherein said controller is also configured to:

activate said aiming indicia providing means in response to said start signal; and deactivate said aiming indicia providing means in response to said distance between said portable data terminal and said surface being within said predetermined range of distances.

20. The portable data terminal of claim 18, further comprising a light sensor for measuring light reflected from said surface, said light sensor being operatively connected to said controller, and wherein said controller is configured to determine said proper shutter speed by:

activating said illumination source;

measuring the amount of light present at said light sensor;

deactivating said illumination source; and determining, in response to said amount of light measured at said light sensor, the proper shutter speed for said camera.

21. The portable data terminal recited in claim 18, wherein said controller is configured to determine said proper shutter speed by:

activating said illumination source;

determining the amount of light present at said camera during a preliminary exposure;

deactivating said illumination source; and determining, in response to said amount of light measured at said camera, said proper shutter speed for said camera.

22. The portable data terminal recited in claim 9, wherein said controller is configured to capture an image of said information indicia by:

activating said illumination source;

exposing said camera to said information indicia, said information indicia being illuminated by said illumination source; and deactivating said illumination source.

23. The portable data terminal recited in claim 18, further comprising a decoder for decoding said image data and thereby providing said output data.

24. The portable data terminal recited in claim 23, wherein said output data comprises alphanumeric data corresponding to said information indicia.

* * * * *